United States Patent [19]

Kerr

[11] Patent Number: 5,393,108

[45] Date of Patent: Feb. 28, 1995

[54] SPHERICAL EXHAUST FLANGE GASKET WITH INTERFERENCE FIT

[75] Inventor: Michael E. Kerr, Dandridge, Tenn.

[73] Assignee: Indian Head Industries, Inc., Charlotte, N.C.

[21] Appl. No.: 75,778

[22] Filed: Jun. 11, 1993

[51] Int. Cl.6 .................. F16L 23/00; F16L 23/16
[52] U.S. Cl. ................. 285/368; 285/332.3; 285/910; 285/379; 285/917; 285/271; 285/363; 277/100; 277/169
[58] Field of Search ............. 285/271, 261, 368, 910, 285/334.1, 332.1, 917, 332.3, 332.2, 379; 277/100, 101, 105, 116, 168, 169

[56] References Cited

U.S. PATENT DOCUMENTS

| | | | |
|---|---|---|---|
| 839,090 | 12/1906 | Ayer | 285/332.3 |
| 954,549 | 4/1910 | Turner | 285/332.3 |
| 992,680 | 5/1911 | Lasch | 285/910 |
| 1,133,320 | 3/1915 | Rockwood | 285/910 |
| 2,864,630 | 12/1958 | Breitenstein | 285/271 |
| 3,139,294 | 6/1964 | Richards | 285/332.3 |
| 3,165,339 | 1/1965 | Faccou | 285/368 |
| 3,480,301 | 11/1969 | Kroening | 285/363 |
| 3,492,834 | 2/1970 | Grantham | 285/332.3 |
| 3,573,870 | 4/1971 | Gastineau | 285/368 |
| 4,088,347 | 5/1978 | Bruggemann et al. | 285/910 |
| 4,428,603 | 1/1984 | Davlin | 285/334.1 |
| 4,463,959 | 8/1984 | Usher et al. | 285/917 |
| 4,751,938 | 6/1988 | Kerns et al. | 285/363 |
| 4,756,561 | 7/1988 | Kawata et al. | 285/187 |
| 5,076,313 | 12/1991 | Bottum, Jr. et al. | 285/917 |
| 5,149,147 | 9/1992 | Kastrup et al. | 285/271 |

FOREIGN PATENT DOCUMENTS

| | | | |
|---|---|---|---|
| 69048 | 5/1941 | Czechoslovakia | 285/271 |
| 2655473 | 6/1978 | Germany | 285/368 |
| 831964 | 4/1960 | United Kingdom | 285/910 |
| 937409 | 9/1963 | United Kingdom | 277/100 |

*Primary Examiner*—Eric K. Nicholson
*Attorney, Agent, or Firm*—Howard & Howard

[57] ABSTRACT

A gasket for use on a exhaust connection between an exhaust manifold and an exhaust pipe includes a spherical sealing portion which mates with sealing portions on both the exhaust manifold and the exhaust pipe. The spherical-to-spherical-to-spherical contact allows adjustment between the various sealing surfaces, while maintaining an adequate seal. Interference fits are utilized to secure the gasket to one of the exhaust manifold and exhaust pipe. Further, a method of forming the gasket involves first drawing a sheet into the general shape, and then punching all required openings in the gasket shape.

12 Claims, 2 Drawing Sheets

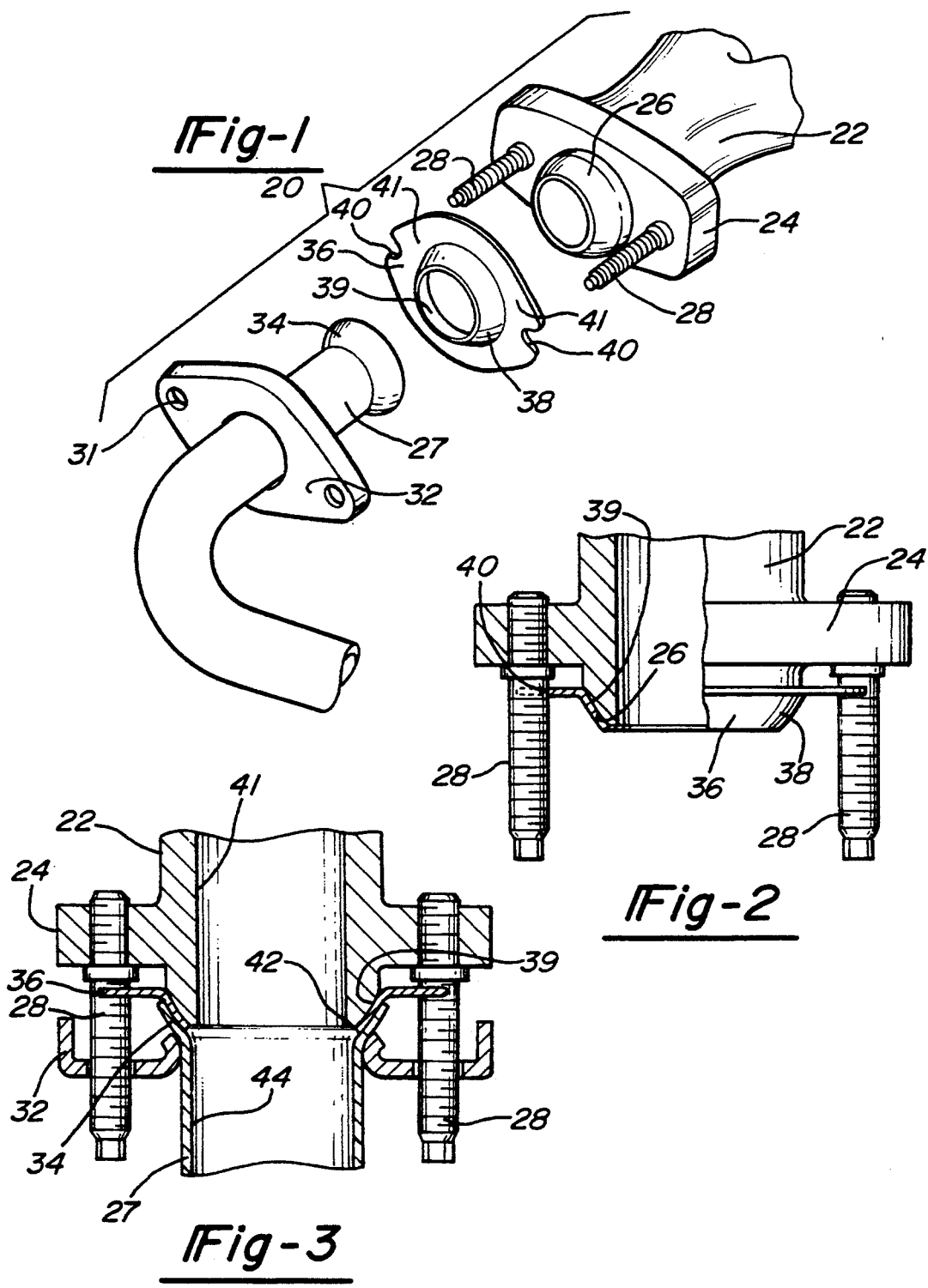

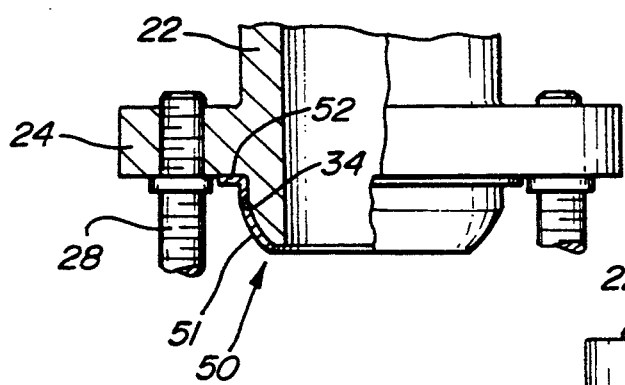
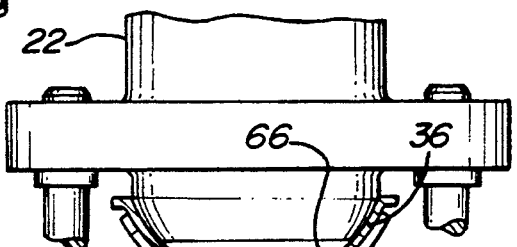
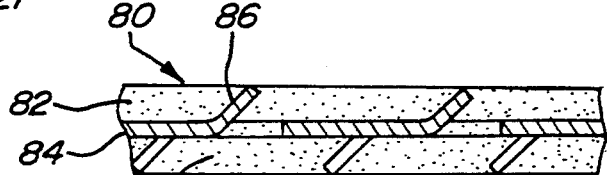
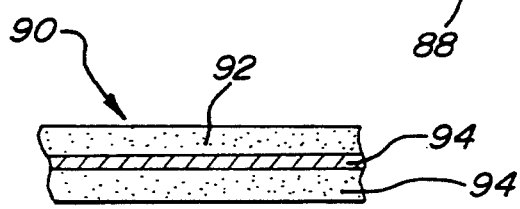

SPHERICAL EXHAUST FLANGE GASKET WITH INTERFERENCE FIT

BACKGROUND OF THE INVENTION

This invention relates to an exhaust flange gasket which seals the interface between an exhaust manifold and an exhaust pipe, wherein the gasket has a spherical sealing portion.

The prior art has traditionally sealed an interface between an exhaust manifold and an exhaust pipe with coined ring gaskets. This type of gasket is somewhat expensive and difficult to manufacture, and in some cases has reduced the strength of the connection between the exhaust manifold and the exhaust gasket. Typically, the prior art gaskets have had frusto-conical surfaces facing mating surfaces on both the exhaust manifold and the exhaust pipe.

In another known exhaust construction, the exhaust manifold has a generally spherical surface which contacts a generally spherical surface on an exhaust pipe in metal to metal contact. Recent tightening of the emission standards established by government regulations have rendered that the metal to metal contact insufficient however, and thus this construction is no longer adequate.

In one known gasket for use in an exhaust coupling, a gasket member has spherical surface facing a surface on a first exhaust pipe and a flat surface contacting a surface on a second exhaust pipe. This type of gasket, while having some beneficial characteristics, does not allow misalignment between the two pipes with continued contact.

SUMMARY OF THE INVENTION

In a disclosed embodiment of this invention, a gasket having a spherical sealing portion is positioned between spherical surfaces on an exhaust manifold and an exhaust pipe. The mating spherical sealing surfaces insure that adequate sealing contact remains between the two pipes and the gasket, even with some misalignment.

In a preferred embodiment the gasket is a thin member having a first spherical surface on an inner face and a second spherical surface on an outer face. Preferably, some structure for holding the gasket to the exhaust manifold and/or exhaust pipe is included. Most preferably an interference fit is utilized.

In a first embodiment the interference fit is provided by ears extending radially outwardly from the spherical sealing surfaces and having slots which are interference fit on exhaust manifold bolts. In a second embodiment, the sealing surface is constructed such that one of its two sealing faces is sized to be an interference fit with a spherical surface on either the exhaust manifold or the exhaust pipe. In yet another embodiment, a neck extends downwardly from the spherical sealing surface on the gasket and is received in a portion of one of the two pipe members. The neck is preferably sized to be an interference fit in the exhaust pipe, thus securing the gasket to the pipe. In a most preferred embodiment of such a gasket the neck is formed with a plurality of fingers and spaces to assist in the insertion of the gasket into the pipe.

In a method according to the present invention, the gasket is initially drawn from a flat sheet to its desired final shape. Openings corresponding to desired holes or bores in the final gasket are then stamped into the drawn shape.

The gasket may be formed out of known gasket materials, including materials having graphite outer faces and a central metal layer. The central metal layer may be solid, or may be perforated and have tangs.

These and other features of the present invention will be more fully understood from the following description of the preferred embodiments, the claims, and the drawings, a brief description of which follows.

BRIEF DESCRIPTION OF THE DRAWINGS

FIG. 1 is a perspective assembly view of an inventive exhaust coupling assembly.

FIG. 2 is a partially cross-sectional view of a portion of the exhaust coupling assembly.

FIG. 3 is a cross-sectional view through the inventive exhaust coupling assembly.

FIG. 4 is a view similar to FIG. 2 but showing a second embodiment,

FIG. 5 is a view showing a third embodiment of this invention.

FIG. 6 is a cross-sectional view showing the third embodiment in place.

FIG. 7 is a cross-sectional view through a first gasket material.

FIG. 8 is cross-sectional view through a second gasket material.

DESCRIPTION OF THE PREFERRED EMBODIMENTS OF THE TUBE FORMING AND COATING PROCESS OF THIS INVENTION

FIG. 1 shows an exhaust coupling 20 for connecting an exhaust manifold 22 having a connection block 24 and spherical sealing surface 26 to an exhaust pipe 27. As shown, manifold bolts 28 extend through bolt holes 31 in a clamp 32 received on exhaust pipe 27. Exhaust pipe 27 has a sealing portion 34 with an inner spherical surface. A gasket 36 includes an outer spherical face 38 adapted to seal on the inner spherical surface of sealing portion 34 on exhaust pipe 27. An inner sealing face 39 on gasket 36 seals on the outer sealing surface 26 of exhaust manifold 22. Slots 40 are formed in radially outward extending ears 41 on gasket 36. Slots 40 are sized to be an interference fit on bolts 28. Thus, the gasket 36 can be positioned on the manifold 22, and received on bolts 28. The inference fit will retain the gasket 36 on the manifold 22 during assembly of the exhaust pipe 27. Further, the interference fit insures that the gasket 36 is properly positioned on the manifold 22.

As shown in FIG. 2, gasket 36 is received on manifold 22 with slots 40 received in interference fit on bolts 28. The exhaust pipe 27 may now be assembled to the manifold 22, and gasket 36 will remain in the proper position.

As shown in FIG. 3, the clamp 34 and exhaust pipe 27 have now been attached to the manifold 22. The thin gasket 36 has inner sealing face 39 sealing on spherical sealing surface 26 of manifold 22 and outer sealing face 38 sealing on spherical sealing face 34 of the exhaust pipe 27. Due to the spherical sealing faces, any misalignment will be compensated for, while insuring that there remains adequate sealing contact between the gasket 36, the exhaust manifold 22, and the exhaust pipe 27. As shown, a bore 41 extends through manifold 22, a bore 42 extends through gasket 36, and a bore 44 extends through exhaust pipe 27. The spherical sealing faces on the gasket are centered on bore 42. The spherical sealing surfaces on manifold 22 and pipe 27 are centered on their respective bores.

As shown in FIG. 4, a second embodiment gasket 50 includes a spherical sealing portion 51 and an radially outer lip 52. Radially outer lip 52 does not include slots received on the bolts 26, but provides strength to sealing portion 51. Gasket embodiment 50 is sized such that the inner sealing face of the spherical sealing portion 51 is an interference fit on the spherical sealing surface 34 on the exhaust manifold 22. Thus, the second gasket embodiment 50 can also be secured on the manifold 22 during assembly of the exhaust pipe. As with the other embodiment, the spherical sealing faces insure that adequate sealing contact remains even given some misalignment between the gasket 50, manifold 22 and the exhaust pipe 27.

As shown in FIG. 5 a third embodiment gasket 60 includes an outer lip 62, a spherical sealing portion 64, and a neck 66 extending downwardly from the spherical sealing portion 64. Neck 66 includes a plurality of fingers 68, and spaces 70 between adjacent fingers 68. Fingers 68 extend downwardly into the pipe of exhaust pipe 27, and provide an interference fit. Thus, the gasket will remain with the exhaust pipe 27 as the exhaust pipe 27 is being assembled to the exhaust manifold 22.

FIG. 6 shows the assembled exhaust coupling with gasket 60. Fingers 68 and spaces 70 ease the insertion of the neck 66 into the bore 44.

FIG. 7 shows a first gasket material 80 which may be utilized with this invention. Gasket material 80 includes a first outer graphite layer 82, a central metal core 84 having perforated tangs 86, and a second outer graphite layer 88.

FIG. 8 shows an alternative gasket material 90. Gasket material 90 includes a first outer graphite layer 92, a solid central metal layer 94 and a second outer graphite layer 96. While any known gasket materials may be utilized, the central core is preferably formed of steel.

In a method of forming the inventive gaskets, a sheet of gasket material, such as material 80 or 90, is initially drawn to the general shape of the preferred embodiment. The various openings are then punched into that pre-formed shape.

Preferred embodiments of this invention have been disclosed, however, a worker of ordinary skill in the art would recognize that certain modifications would come within the scope of this invention. For that reason, the following claims should be studied in order to determine the true scope and content of this invention.

What is claimed is:

1. A gasket comprising:
a thin body having a sealing portion, said sealing portion having an inner face with an inner generally spherical surface, and an outer face having an outer generally spherical surface;
a bore extending along a central axis and through said thin body member, said inner and outer spherical surfaces being centered on said central axis;
said gasket being constructed to provide a holding structure to secure said body to an exhaust manifold or an exhaust pipe, said holding structure being provided by sizing the gasket to provide an interference fit on structure on either the exhaust manifold or the exhaust pipe; and
a neck portion extending axially from a radially inner portion of said sealing portion, said neck portion being sized to provide an interference fit with the inner periphery of a bore in either an exhaust manifold or an exhaust pipe.

2. A gasket as recited in claim 1, wherein said body includes at least one ear extending radially outwardly from said sealing portion, said ear having a slot, said slot being sized to provide an interference fit on a manifold bolt found on an exhaust manifold.

3. A gasket as recited in claim 1, wherein one of said inner spherical surface or said outer spherical surface is sized such that it will provide an interference fit with a mating surface on an exhaust manifold or an exhaust pipe.

4. The gasket as recited in claim 3, wherein said inner spherical surface is sized to be an interference fit with a mating surface on an exhaust manifold.

5. A gasket as recited in claim 1, wherein said neck is formed to have alternating fingers and spaces to ease insertion of said neck into the bore in the exhaust manifold or pipe.

6. A gasket as recited in claim 1, wherein a lip extends radially outwardly from a radially outermost extent of said sealing portion to provide additional rigidity to said gasket.

7. A gasket as recited in claim 1, wherein a lip extends radially outwardly from a radially outermost extent of said sealing portion to provide additional rigidity to said gasket.

8. An exhaust connection comprising:
a. A first pipe having a generally spherical sealing surface, said first pipe being an exhaust manifold having an outer spherical sealing surface;
b. A second pipe also having a generally spherical sealing surface, said second pipe being an exhaust pipe having an inner spherical sealing surface;
c. Mounting bolts for selectively connecting said first pipe to said second pipe.
d. a bore extending through both said first and second pipes, said sealing surfaces on said first and second pipes corresponding to each other;
e. a thin gasket received between said sealing surface on said first and second pipes, said gasket having a sealing portion with an inner spherical face adapted to correspond to said sealing surface at said outer surface and said gasket also having an outer spherical fane to correspond to said sealing surface of said inner surface;
f. wherein there is a structure on said gasket to secure said gasket to one of said exhaust manifold and said exhaust pipe; and
g. said structure includes said gasket providing an interference fit between a portion of said gasket and a portion of said exhaust manifold or said exhaust pipe, said interference fit being provided by a neck extending axially from a radially inner surface of said sealing surface on said gasket, said neck providing an interference fit with said bore in said one of said exhaust manifold and said exhaust pipe bores.

9. An exhaust connection as recited in claim 8, wherein said structure includes said gasket providing an interference fit between a portion of said gasket and a portion of said exhaust manifold or said exhaust pipe.

10. An exhaust connection as recited in claim 9 wherein, and ears extend radially outwardly from said sealing surfaces on said gasket, said ears having a slot, each said slot being sized to provide an interference fit with one of said bolt on said exhaust manifold.

11. An exhaust connection as recited in claim 9, wherein said structure includes an interference fit between said inner peripheral sealing surface on said gasket and said outer peripheral sealing surface on said one of said exhaust manifold and said exhaust pipe.

12. A gasket comprising:

a thin body having a sealing portion, said sealing portion having an inner face with an inner generally spherical surface, and an outer face having an outer generally spherical surface;

a bore extending along a central axis and through said thin body member, said inner and outer spherical surfaces being centered on aid central axis;

said body including at least one ear extending radially outwardly from said sealing portion, said ear having a slot sized to provide an interference fit on a manifold bolt found on an exhaust manifold; and there being a pair of opposed ones of said ears extending radially outwardly, each of said ears having a slot including openings extending to the outer peripheral surface of said ears such that said slots can be positioned over mounting bolts, each of said slots providing an interference fit on a manifold bolt.

* * * * *

UNITED STATES PATENT AND TRADEMARK OFFICE
CERTIFICATE OF CORRECTION

PATENT NO. : 5,393,108
DATED : February 28, 1995
INVENTOR(S) : Michael E. Kerr

It is certified that error appears in the above-indentified patent and that said Letters Patent is hereby corrected as shown below:

In Claim 8, column 4, line 46 of the Patent, delete "fane" and insert --face--

Signed and Sealed this

Sixth Day of June, 1995

Attest:

BRUCE LEHMAN

*Attesting Officer*    *Commissioner of Patents and Trademarks*